United States Patent
Scott et al.

(10) Patent No.: US 7,085,768 B2
(45) Date of Patent: Aug. 1, 2006

(54) DATA STORAGE SYSTEM

(75) Inventors: Tim Scott, Berkshire (GB); Denis Michael Goddard, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 613 days.

(21) Appl. No.: 10/228,043

(22) Filed: Aug. 27, 2002

(65) Prior Publication Data

US 2003/0115223 A1 Jun. 19, 2003

(30) Foreign Application Priority Data

Dec. 17, 2001 (GB) .......................................... 0130119.1

(51) Int. Cl.
*G06F 17/30* (2006.01)

(52) U.S. Cl. .................... 707/101; 707/203; 707/104.1; 707/201; 715/511

(58) Field of Classification Search ................. 707/203, 707/104.1, 201, 101; 715/511
See application file for complete search history.

(56) References Cited

U.S. PATENT DOCUMENTS 4,809,170 A    2/1989  Leblang et al.
5,574,898 A   11/1996  Leblang et al.
5,920,867 A *  7/1999  Van Huben et al. ........ 707/101
5,950,210 A *  9/1999  Nelson ........................ 707/203
6,085,036 A    7/2000  Bandat
6,243,718 B1   6/2001  Klein et al.
6,374,263 B1 * 4/2002  Bunger et al. .............. 707/201

FOREIGN PATENT DOCUMENTS

EP         0 520 459 A3    12/1992

* cited by examiner

*Primary Examiner*—Charles Rones
(74) *Attorney, Agent, or Firm*—Swidler Berlin LLP (57) ABSTRACT

A data storage system for storing a number of versions of a number of objects, the versions of the objects being arranged in branch groups, at least one version of at least one object defines a branch group, and the versions of the objects are stored in accordance with their branch group, comprising: an object branches table including a branch column, an object identity column, a version sequence column and an object data column, wherein data identifying the branch group, the object and the number of versions of the object in the branch group are stored in the branch column, object identity column and the version sequence column respectively, and the versions of the objects in each branch group are stored in the object data column, and wherein the object branches table is arranged such that only one row of the object branches table is provided corresponding to each object.

21 Claims, 9 Drawing Sheets

| | 201 | 202 | 203 | 204 | 205 | 206 |
|---|---|---|---|---|---|---|
| | Branch | Object Identity | Version Sequence | Object Data | Predecessor | ... |
| 210 | X | A | 5 | ΔXA1 ΔXA2 ΔXA3 ΔXA4 XA5 | ... | ... |
| 211 | X | ... | ... | ... | ... | ... |
| 212 | Y | A | 3 | ΔYA1 ΔYA2 YA3 | XA2 | ... |
| 213 | Y | B | 2 | ΔYB1 YB2 | ... | ... |
| 214 | Y | C | 4 | ΔYC1 ΔYC2 ΔYC3 YC4 | ... | ... |
| 215 | Y | ... | ... | ... | ... | ... |
| 216 | Z | A | 3 | ΔZA1 ΔZA2 ZA3 | XA3 | ... |
| 217 | Z | ... | ... | ... | ... | ... |

| | Branch | Object Identity | Version Sequence | Object Data | Predecessor |
|---|---|---|---|---|---|
| 200 → | (201) | (202) | (203) | (204) (205) | (206) |
| 210) | X | A | 5 | ΔXA1 ΔXA2 ΔXA3 ΔXA4 XA5 | |
| 211) | X | ⋮ | ⋮ | ⋮ | ⋮ |
| 212) | Y | A | 3 | ΔYA1 ΔYA2 YA3 | XA2 |
| 213) | Y | B | 1 | YB1 | |
| 214) | Y | C | 4 | ΔYC1 ΔYC2 ΔYC3 YC4 | |
| 215) | Y | ⋮ | ⋮ | ⋮ | ⋮ |
| 216) | Z | A | 3 | ΔZA1 ΔZA2 ZA3 | XA3 |
| 217) | Z | ⋮ | ⋮ | ⋮ | ⋮ |

Fig.4.

| Branch | Object Identity | Version | Working | ... |
|---|---|---|---|---|
| X | A | 1 | | ... |
| X | A | 2 | | ... |
| X | A | 3 | | ... |
| X | A | 4 | | ... |
| X | A | 5 | | ... |
| X | ... | ... | | ... |
| Y | A | 1 | | ... |
| Y | A | 2 | | ... |
| Y | A | 3 | | ... |
| Y | B | 1 | | ... |
| Y | C | 1 | | ... |
| Y | C | 2 | | ... |
| Y | C | 3 | | ... |
| Y | C | 4 | | ... |
| Y | ... | ... | | ... |
| Z | A | 1 | | ... |
| Z | A | 2 | | ... |
| Z | A | 3 | | ... |
| Z | ... | ... | | ... |

Fig.5.

| Branch | Object Identity | Version Sequence | Object Data | Predecessor | |
|---|---|---|---|---|---|
| | (201) | (202) | (203) | (204) | (205) (206) |
| (210) | X | A | 5 | ΔXA1 ΔXA2 ΔXA3 ΔXA4 XA5 | ⋮ |
| (211) | X | ⋮ | ⋮ | ⋮ | ⋮ |
| (212) | Y | A | 3 | ΔYA1 ΔYA2 YA3 | XA2 |
| (213) | Y | B | 1 | YB1 | ⋮ |
| (214) | Y | C | 4 | ΔYC1 ΔYC2 ΔYC3 YC4 | ⋮ |
| (215) | Y | ⋮ | ⋮ | ⋮ | ⋮ |
| (216) | Z | A | 3 | ΔZA1 ΔZA2 ZA3 | XA3 |
| (217) | Z | ⋮ | ⋮ | ⋮ | ⋮ |
| (218) | T | C | 1 | TC1 | YC1 |
| (219) | T | ⋮ | ⋮ | ⋮ | ⋮ |

| Branch | Object Identity | Version | Working | ... |
|---|---|---|---|---|
| X | A | 1 | | ... |
| X | A | 2 | | ... |
| X | A | 3 | | ... |
| X | A | 4 | | ... |
| X | A | 5 | | ... |
| X | ... | ... | | ... |
| Y | A | 1 | | ... |
| Y | A | 2 | | ... |
| Y | A | 3 | | ... |
| Y | B | 1 | | ... |
| Y | C | 1 | | ... |
| Y | C | 2 | | ... |
| Y | C | 3 | | ... |
| Y | C | 4 | | ... |
| Y | ... | ... | | ... |
| Z | A | 1 | | ... |
| Z | A | 2 | | ... |
| Z | A | 3 | | ... |
| Z | ... | ... | | ... |
| T | C | 1 | | ... |
| T | ... | ... | | ... |

Fig.7.

| Branch | Object Identity | Version | Working | ... |
|---|---|---|---|---|
| X | A | 1 | | ... |
| X | A | 2 | | ... |
| X | A | 3 | | ... |
| X | A | 4 | | ... |
| X | A | 5 | | ... |
| X | ... | ... | | ... |
| Y | A | 1 | | ... |
| Y | A | 2 | | ... |
| Y | A | 3 | | ... |
| Y | B | 1 | | ... |
| Y | B | CO | 2 (Contents) | ... |
| Y | C | 1 | | ... |
| Y | C | 2 | | ... |
| Y | C | 3 | | ... |
| Y | C | 4 | | ... |
| Y | ... | ... | | ... |
| Z | A | 1 | | ... |
| Z | A | 2 | | ... |
| Z | A | 3 | | ... |
| Z | ... | ... | | ... |

Fig. 8.

| | Branch | Object Identity | Version Sequence | Object Data | Predecessor |
|---|---|---|---|---|---|
| 210 | X | A | 5 | ΔXA1 ΔXA2 ΔXA3 ΔXA4 XA5 | ... |
| 211 | X | ... | ... | ... | ... |
| 212 | Y | A | 3 | ΔYA1 ΔYA2 YA3 | XA2 |
| 213 | Y | B | 2 | ΔYB1 YB2 | ... |
| 214 | Y | C | 4 | ΔYC1 ΔYC2 ΔYC3 YC4 | ... |
| 215 | Y | ... | ... | ... | ... |
| 216 | Z | A | 3 | ΔZA1 ΔZA2 ZA3 | XA3 |
| 217 | Z | ... | ... | ... | ... |

Fig.9.

| Branch | Object Identity | Version | Working | ... |
|---|---|---|---|---|
| X | A | 1 | | ... |
| X | A | 2 | | ... |
| X | A | 3 | | ... |
| X | A | 4 | | ... |
| X | A | 5 | | ... |
| X | ... | ... | | ... |
| Y | A | 1 | | ... |
| Y | A | 2 | | ... |
| Y | A | 3 | | ... |
| Y | B | 1 | | ... |
| Y | B | 2 | | ... |
| Y | C | 1 | | ... |
| Y | C | 2 | | ... |
| Y | C | 3 | | ... |
| Y | C | 4 | | ... |
| Y | ... | ... | | ... |
| Z | A | 1 | | ... |
| Z | A | 2 | | ... |
| Z | A | 3 | | ... |
| Z | ... | ... | | ... |

DATA STORAGE SYSTEM

The present invention relates to a data storage system for storing a number of versions of data objects, for example program files.

In the development of many software products, for example operating systems, database management software and word processors, typically a large number of software developers work upon individual aspects of the software product. These individual aspects are known as objects. The development work is divided amongst the system developers and each, either individually or in groups, works upon particular objects. The objects are brought together to form the final software product for shipping to the consumer.

Such software development produces considerable technical problems in that, as each object is developed individually, the manner in which the objects interact with each other is also affected. It is therefore vital to monitor the development of each object and to retain copies of the objects at various stages of their development.

Configuration management tools have been developed for this purpose. These typically provide a "versioning" facility in which versions of each object are stored as they are developed. Versioning generally produces a new copy of an object each time it is modified and saved by the software developer during their work. One example of such software is ClearCase by Rational. This software manages each of the objects which are stored in a data "repository" that is accessible by each software developer. Whenever a software developer wishes to work on an object, the object file is "checked out" from the repository. This involves the copying of the specific file to a location where it is made available for modification by the developer. Following modification, the new version of the object file is checked back into the repository and is labelled with a new version name.

In large scale projects, there may be thousands of software developers, many of whom regularly produce new versions of the objects.

The structure of the repository is determined by metadata which in turn is arranged according to a corresponding metamodel. Recently, there have been developments away from file based objects with a view to managing more general information for example information relating to the structure and operation of businesses, so called "enterprise" metadata. One example of how such information can be manipulated and stored is by the use of relational tables. Designer 6i, available from Oracle Corporation is capable of handling such objects and also provides a versioning facility. This allows the expression of powerful queries of the metadata whereas it is much more difficult to query this information if it is contained in files.

Some conventional systems also encounter practical volume limitations which seriously affect their scalability. One known method of addressing this problem involves using multiple instances of the repository, each instance being known as a "VOB". However, in large projects there may be a requirement for many such VOBs and this leads to large administration costs.

A second major problem with conventional systems is that the metadata are actually stored in the files that also contain the objects' data. This leads to performance problems in operations that involve the accessing of large amounts of metadata.

One reason for this is that present repositories such as that provided by Designer 6i, are organised as an "object table" according to a metamodel. Each version of every object is stored in the object table along with a corresponding "primary key" which uniquely identifies the version of the object. The primary key for each row of the object table is generated using a known algorithm. The size of the object table is directly dependent upon the number of objects stored and the number of versions of each object. For large software development projects in particular, the size of the object table generates problems due by the processor time required to address and access the object table contents.

One procedure that is particularly time consuming in known systems is the formation of a "stripe". This is the downloading of particular versions of a number of objects that are related in some way. This is necessary for analysing the interaction of the objects and indeed in the production of the software product as a whole. In conventional systems the formation of a stripe is treated as a single request from a developer in a similar manner to any other request such as for the modification of an object. However, stripe formation requires a great deal of processor time because a large number of objects are required to be accessed. The storage of the metadata with the object data seriously hinders this process and in addition, because the stripe formation is treated as a single request, it is required to be completed before any further tasks may be performed upon the objects in question. For this reason no access will be granted to other users of the particular objects accessed during the stripe formation, until this process has been completed.

Many hours of system developer time may be lost as conventionally a single typical stripe download may take a number of hours to process. In systems with high administration costs, this lost time is particularly significant.

Known systems are also provided with a "locking mechanism" which is used to ensure that updates and access of the repository occurs in the correct order. This prevents software developers from accessing any objects which are currently being accessed by another process. For a large table this may cause significant delays. The formation of a stripe is particularly costly in terms of developer time as, because the stripe formation is treated as a single request, the locking mechanism operates to prevent access to any of the objects involved until the stripe formation process has been completed.

The problems identified above are becoming increasingly significant in that software is ever more complex and the structure of known configuration management systems is becoming increasingly unsuitable for managing their development.

In accordance with the present invention, we provide a data storage system for storing a number of versions of a number of objects, the versions of the objects being arranged in branch groups, wherein at least one version of at least one object defines a branch group, and wherein the versions of the objects are stored in accordance with their branch group, the system comprising:

an object branches table including a branch column, an object identity column, a version sequence column and an object data column, wherein data identifying the branch group, the object and the number of versions of the object in the branch group, are stored in the branch column, object identity column and the version sequence column respectively, and the versions of the objects in each branch group are stored in the object data column, and wherein the object branches table is arranged such that only one row of the object branches table is provided corresponding to each object in each branch group; and, an object versions table having a branch column, an object identity column, a version column and a working column, wherein data identifying the branch group, the object and the object version in the branch group are stored in the branch column, object identity column and version column respectively, and subsequent versions of the objects are generated in the working column, and wherein the object versions table is arranged such that one table row is provided corresponding to each version of each object in each branch group.

We have realised that the above identified problems can be addressed by redesigning the structure of the storage system and the nature of the way in which the objects are stored. In particular, great advantage is provided by the provision of the object branches table and the object versions table in combination rather than the single data structure used in known systems. The use of two tables allows for much faster access as it is generally the object branches table that is addressed rather than the object versions table.

The object branches table is made particularly efficient by the storage of object versions according to their branch group, with one table row being provided for each object belonging to a branch group. The grouping of the object versions in the table allows for much improved access speeds particularly as the number of resultant rows in the object branches table is reduced with respect to the size of the single object table used in known systems.

In general a number of the object versions in the object data column are stored in a compressed format. This compression significantly reduces the amount of data stored and can be made particularly efficient as in most cases the data defining different versions of the objects are very similar.

Preferably, for each version of an object in a branch group, each version other than the most recent version is stored in a format based upon differences between the object versions. Preferably this takes the form of a compression algorithm. This is similar to the function provided by the software "XDelta". In this case, the versions of file objects are therefore stored in the form of 'deltas' which are then compressed on a per-branch basis. This technique of compressed version differencing along a branch is not used in known systems due to their inherent structure. For example, in a conventional RDBMS-based system such as Designer 6i, each version of an object is provided within a separate row in the object table and therefore the use of deltas is impractical. In conventional, non RDBMS-based systems such as RCS, SCCS, XDelta, and CVS, all version differences for a file are stored in a single data structure.

Typically the data used to identify a branch group in the branch column and/or the data used to identify the data objects in the object identity column is identical for the object branches table and the object versions table.

The data in the branch column and the object identity column of the object branches table preferably forms the primary key for locating the versions of the object for a particular branch group. In addition, the version sequence column may indicate the number of object versions stored in each row. This allows the safe deletion, or removal to archive storage, of particular branches of objects that are no longer used.

In addition, preferably the primary key for the object versions table is provided by the data held in the branch column, the object identity column and the version column in combination. This uniquely identifies a particular version of an object within a branch group.

In cases where the primary key is constructed from data identifying the branch group, the individual parts of the primary key allow the allocation of the objects into particular branch groups. This allocation allows particular branch groups to be taken "off line" and worked upon individually without affecting the general system as a whole.

Preferably part of the object branches table and the object versions table relating to a branch group are separated into corresponding partitions within the database. In particular corresponding parts of the object branches table and the object versions table can be partitioned into separate database files for one or more specific branch groups. Faster accessing of the information can therefore be achieved as related information is stored together. Further advantages are provided in terms of file backups and maintenance as the ability to take part of the system off-line reduces the probability that the entire system will be required to be shut down for any reason.

As groups of developers tend to work upon a particular branch group then in the case where those developers working on different branch groups are geographically separated, there is also a reduction in the amount of data traffic via communications networks.

The object versions table is provided to store meta-data for new versions of all objects. Such meta-data includes, for example, the date and time when the version was created, the identity of the individual who made the change, the version number, comments, and so on. One way in which the modification of an object may be achieved is by copying a version of an object from the object branches table and temporarily storing this in the working column. In this case, following modification, the object is returned to the corresponding row of the object branches table as a new version and an additional corresponding row in the object versions table is generated.

Although a separate row is provided for each version of each object in a branch group, the object itself is not stored in the object versions table. The object versions table is therefore not accessed as frequently as the object branches table. However, the provision of the separate object versions table also provides for the ability to store additional meta-data about the individual versions of the objects.

Preferably branching information is also stored, in that, when an object version in one branch group is generated using an object version in either the same or a different branch group, the object branches table further comprises a column for storing data describing the relationship between the object versions in the different branch groups. For a particular object version, this additional column may therefore identify the successor or predecessor to the object version found in a different branch group. Preferably the column for storing the data relating the object versions, is a predecessor column. In this case, for a particular object version in the object branches table, the data in the predecessor column is preferably only stored if the object version used to generate that particular object version, is in a different branch group. For object versions generated from those within the same branch group, the system is preferably arranged such that the relationship between them is assumed.

An example of a data storage system according to the present invention will now be described with reference to the accompanying drawings, in which.

Figure 1:
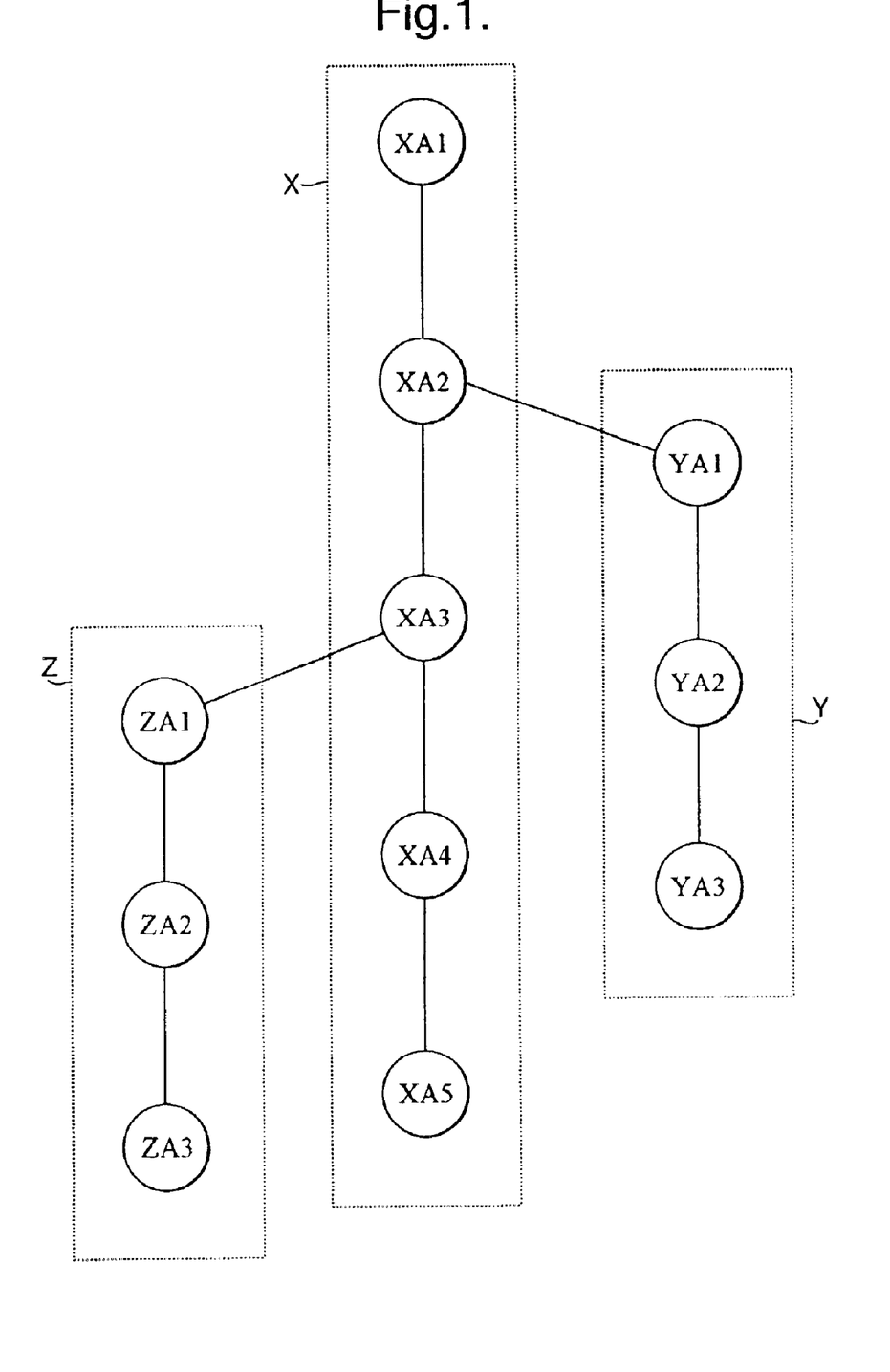
FIG. 1 is an illustration of the relationship between object versions and branch groups.

FIG. 1 shows the relationship between a number of versions of a particular object A. Generally this development can be thought of as a function of time although this is not essential as new versions can be created from any object version at any time. The earliest version of the object A is indicated by XA1 in FIG. 1. Subsequent versions XA2, XA3, XA4 and XA5 are also shown, each representing a development of the previous version.

In FIG. 1, the versions of the object XA1 to XA5 define a branch group X, this branch group X being the main development branch group associated with a software product. However, as shown in FIG. 1 a second object version YA1 is created from the object version XA2. This might represent the situation when an early release of the software product containing the object A, is required to be shown to investors. In this case a particular functionality of the object A might be required for the release.

The version YA1 forms the first version of the object A within a separate branch group Y, this object then being developed into the subsequent versions YA2 and YA3. The nomenclature of the object versions indicates the branch group "Y", the object identity "A" and the version "3" of the object within the branch group. Here the branch group Y is a branch group created solely for the purposes of working upon a number of particular objects for an early software release. Such a release would typically contain objects from the branch group Y along with others from other branch groups. The object versions YA2 and YA3 represent small developments made to the object YA1 prior to the generation of the final release.

Referring to the main branch group X, the object version XA3 also results in an additional object version ZA1. In this case the version ZA1 forms the first object in another separate branch group Z, with subsequent versions being ZA2 and ZA3. In this case the branch group Z is a "bug fix" branch group generated to resolve potential problems with the software.

FIG. 1 therefore represents the development of various versions of the object A and their grouping into particular branch groups X to Z. It should be noted that a software product for sale to consumers may contain many thousands of such objects from many branch groups and various versions and public releases of such software will contain one version of each object only. For example, a number of versions of an early software release may be produced. The first of these might include the object version YA1 whereas a later version might include the object version YA2 created as a result of further development.

Any object version can be accessed at any stage during development which conveniently allows for the formation of new branch groups at any time.

FIG. 1 only shows a number of versions of one object within each branch group. However, in general branch groups contain between one and many thousands of objects. This is simply illustrated in FIG. 2 where versions of three different objects are shown belonging to the branch group Y.

The object versions YA1, YA2 and YA3 are represented corresponding to those depicted in FIG. 1. In addition, a single object version YB1 of a different object B is shown, along with four versions of another object C, that is YC1, YC2, YC3 and YC4. When a new branch group is created, one version of each object may be placed in the new branch group. However, in other situations, a number of versions of each object may be placed in the branch group. This might occur particularly when one branch group is generated from a copy of an existing branch group.

In the present example a database is used to contain the versions of the objects along with any related data in order to define their interaction. The object versions are organised and stored according to an object branches table 200 and an object versions table 300.

Figure 3:
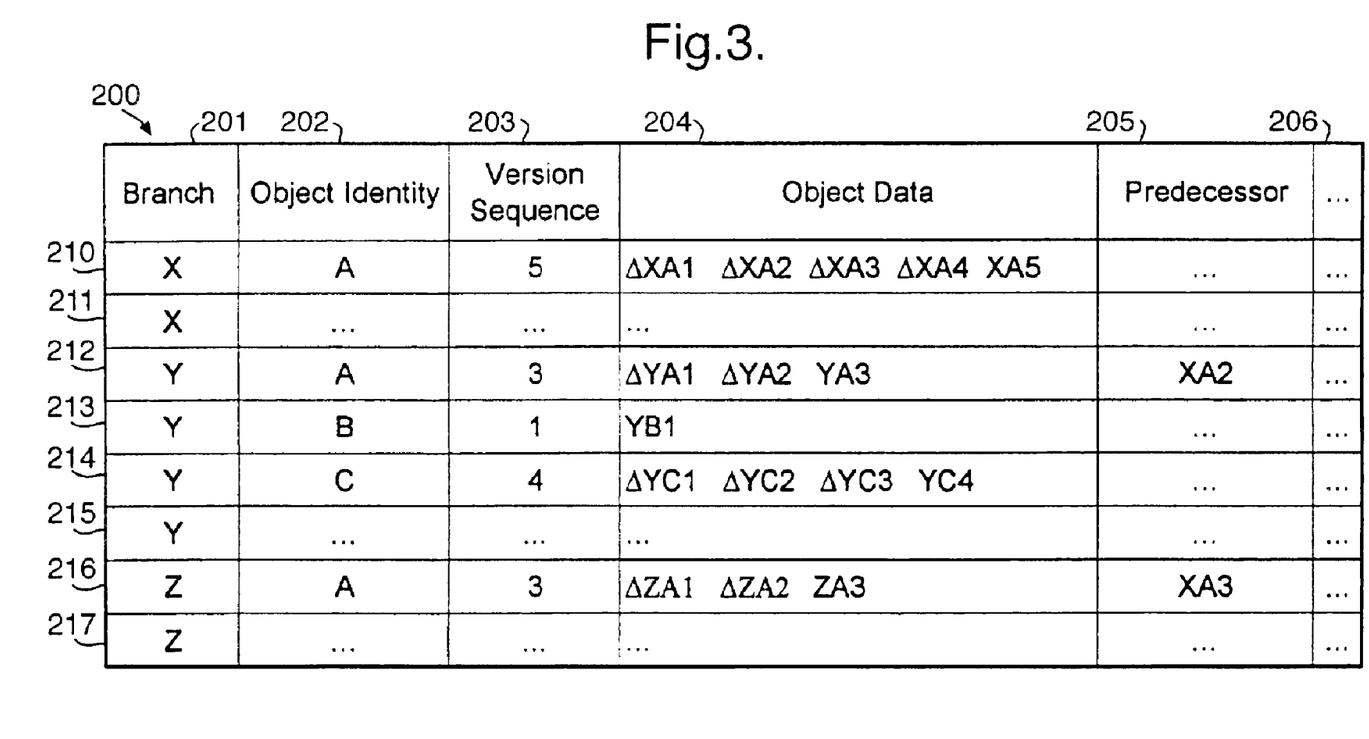
FIG. 3 shows an example of an object branches table.

FIG. 3 shows an example of the object branches table 200 arranged as columns and rows. The object branches table 200 has a branch column 201, an object identity column 202, a version sequence column 203, an object data column 204 and a predecessor column 205. This representation is only schematic and in reality a number of other columns are provided as would be recognised by a skilled person. These additional columns are generally represented by the additional column at 206.

Each row in the object branches table 200 corresponds to all versions of a particular object associated with a particular branch group. Therefore if a branch group contains only one object, it is represented by a single row in the object branches table 200, regardless of the number of versions of this object that are present within the branch group. If a branch group contains two different objects, then two rows will be present, one corresponding to each, and so on.

Referring to FIG. 3, the first row 210 of the object branches table 200 corresponds to the branch group X as shown in FIG. 1. The row 210 is provided for all versions of the object A contained within the branch group X. Therefore, an "X" in the branch column 201 identifies the branch, and a "A" in the object identity column 202 in the row 210 identifies the object. It will be appreciated that the branch column 201 need not actually contain the name of the branch group as long as the branch group can be identified by the contents of this column which might therefore be other data or a cross-reference to a further table containing the actual branch group names.

The version sequence column 203 contains a "5" signifying that the branch group X contains five versions of the object A. These are the versions XA1 to XA5 shown in FIG. 1. The version sequence column in this example is effectively a counter that contains the number of versions of each object in a branch group. The primary purpose of the version sequence column information is to identify the latest version of an object checked in on a branch. This enables the unique identification of the next version of the object to be created.

The object data column 204 stores each version of the objects XA1 to XA5 in a single field. The name used for each of these versions is actually the primary key for identifying their corresponding rows in the object versions table 300 as will be described. The individual rows of the object branches table 200 are identified using a primary key comprising the branch column 210 and the object identity column 211, for example "YC" is the primary key for the row containing the versions of the objects C in branch group Y (that is YC1 to YC4).

Returning to column 204, the "Δ" symbol denotes the storage of versions of the object A following a "delta" operation and subsequent compression. The algorithm used to achieve these operations in the present example is based on a generic file differencing algorithm that compares two files and expresses one file as a function of the second in terms of the identified differences between the file contents. For files that are very similar, only a very small amount of data is required to express the differences between them.

Once this has been performed, the resultant data are then compressed. This method is particularly advantageous in the present example as subsequent versions of files will contain many similarities with their predecessors. As the compression method is lossless, previous versions can be reliably reconstructed.

In the object data column 204 of row 210, the objects XA1 to XA4 each have an associated "Δ" symbol, whereas the latest version XA5 does not. However to conserve storage space the latest version XA5 is nevertheless stored in a compressed format even though this has the greatest chance of being accessed by a software developer.

Considering the object version XA4, the symbol "ΔXA4" indicates that the object version XA4 is stored in a compressed delta format. To regenerate the version XA4, the compressed delta version ΔXA4 is required in addition to the fully expanded version of the object version XA5, as ΔXA4 was originally generated using the fully expanded object version XA5. The compressed object version XA5 is therefore fully expanded and the compressed version of ΔXA4 is decompressed. A reverse delta operation is then performed using the decompressed ΔXA4 and the fully expanded object version XA5, in order to produce a fully expanded object version XA4.

To decompress the object version XA3, the object version XA4 has to be fully expanded first, followed by the full expansion (decompression and reverse delta) of the version XA3 using ΔXA3 and the fully expanded XA4. A similar chain of expansion and decompression is used to access all previous versions. Therefore, the earliest version XA1 requires the greatest number of processing steps. However, as the object version XA1 is the earliest, it will generally have the smallest probability of requiring access.

The second row 211 in FIG. 3 is also related to the branch group X. This symbolises the possible existence of objects other than the object A within the branch group X. An example of a branch group containing multiple objects is shown in rows 212 to 215. These correspond to the early software release branch group Y shown in FIGS. 1 and 2.

The row 212 is provided for the object A. There are three versions of object A in this branch group Y, these being objects YA1 to YA3. Again the earlier object versions YA1 and YA2 are stored in the compressed delta form.

The row 213 is provided for the object B. The only version of this object in the branch group Y is the object version YB1 and therefore this is stored only in a compressed format in the object data column 204.

Figure 2:
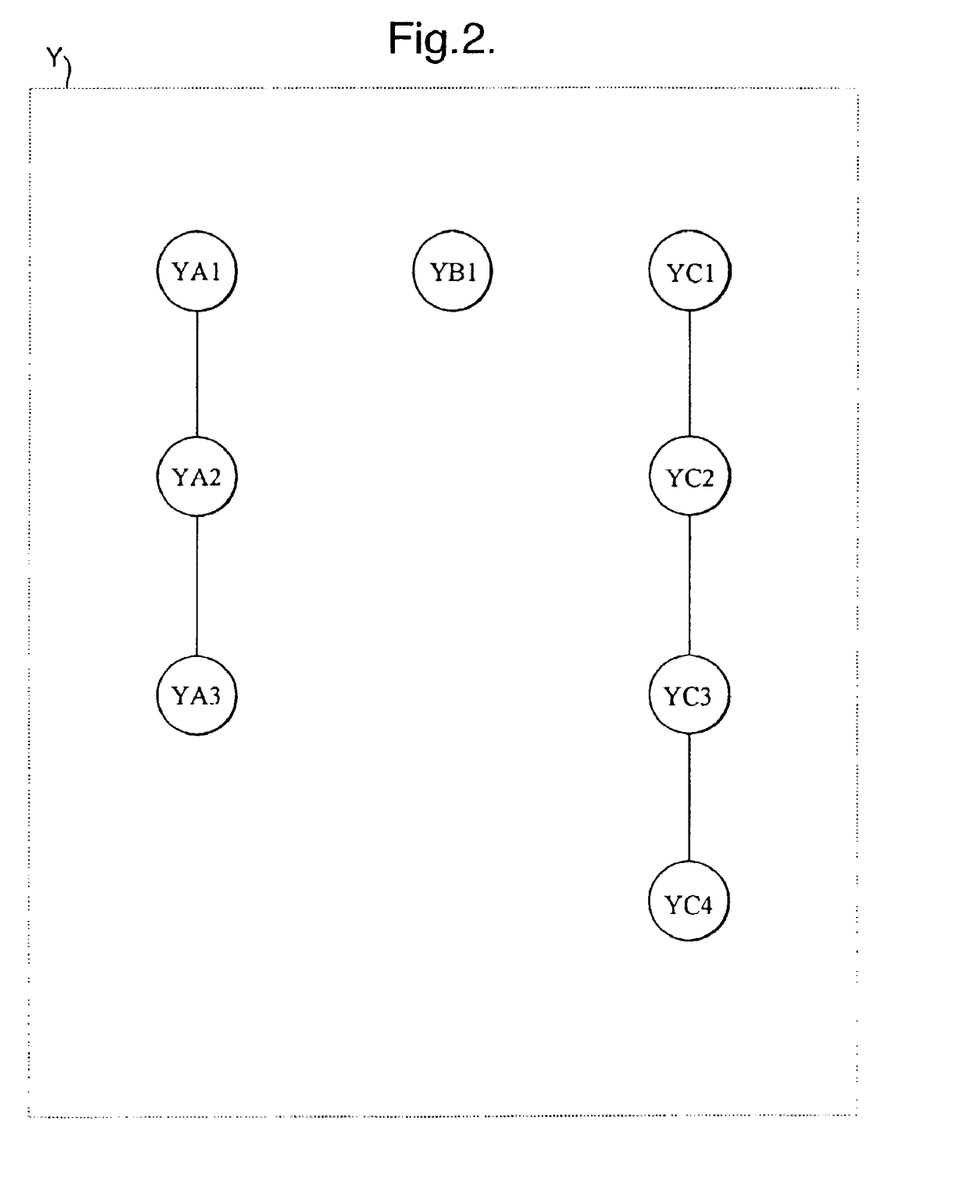
FIG. 2 shows a branch group containing a number of versions of different objects.

The third row 214 is used for the object C as shown in FIG. 2. This comprises the versions YC1 to YC4 and again the versions YC1 to YC3 are stored in the compressed delta format, with the version YC4 being stored in only a compressed form.

An additional row 215 is also denoted, indicating the possibility of the existence of further objects belonging to the branch group Y as would ordinarily be the case.

The branch group Z is also shown, having a corresponding row 216 and a row 217 indicating the possible existence of further objects in the branch group Z.

The rows of the object branches table 200 each have a similar format and for large software products it will be appreciated that there may be many thousands of these rows corresponding to every object within every branch group.

The additional columns represented by the column 206 contain data that broadly falls within two categories, that is audit information and other metadata. Examples of audit information include the identity of the developer who created the branch group originally, and when this event occurred. Examples of other metadata include comments from the developer such as explanations of why the branch group was created. This information is therefore generally provided in a human readable form.

The predecessor column 205 provides the object branches table 200 with the facility to store branching information associated with the branch groups. In the present example only "fan out" branching information is stored in the object branches table. Fanning out of the branch groups occurs when one object version is used as a parent for object versions in more than one branch group. Referring to FIG. 1, this occurs for the object version XA2 in the creation of object versions YA1 and YA2 (branch groups X and Y respectively), and a second example occurs at XA3 in the creation of ZA1 to ZA3 (branch groups X and Z respectively).

The position of each branch point is stored in the predecessor column 205 of the object branches table 200 by storing the branch and object version which is the parent of the first object within the new branch group.

For example, the object version XA2 is the predecessor for the object version YA1 in branch group Y. The row containing the object version YA1 in branch group Y (row 212 in FIG. 3) has a corresponding identity "XA2" in the predecessor column 205. In this case, only the branch points are stored in the object branches table 200, whereas for other object versions within a branch group, a linear development from the predecessor in the same branch group is assumed. Null entries are therefore provided in the predecessor column 205 for objects having a parent versions within the same branch or for object versions having no parent (for example object version XA1 in FIG. 1). A further example of a branch point is shown at row 216, for the object 1 in the branch group Z. The object version ZA1 has a predecessor of the object version XA3 in the branch group X.

The storage of this information in the object branches table 200 provides a performance advantage over prior art systems where the manner in which the data was stored required the use of a completely separate table for the storage of branch information, called the "object version merges table".

Although the "fan out" information of branch groups is stored in the object branches table 200, this is not the case for "fan in" information where branch groups are combined together. A "fan in" point occurs much less frequently and therefore the information detailing where such points occur is stored in an entirely separate table. This helps to reduce the overall size of the object branches table 200 which is in turn beneficial to the overall processing speed, in particular identifying significant branch and merge points.

Figure 4:
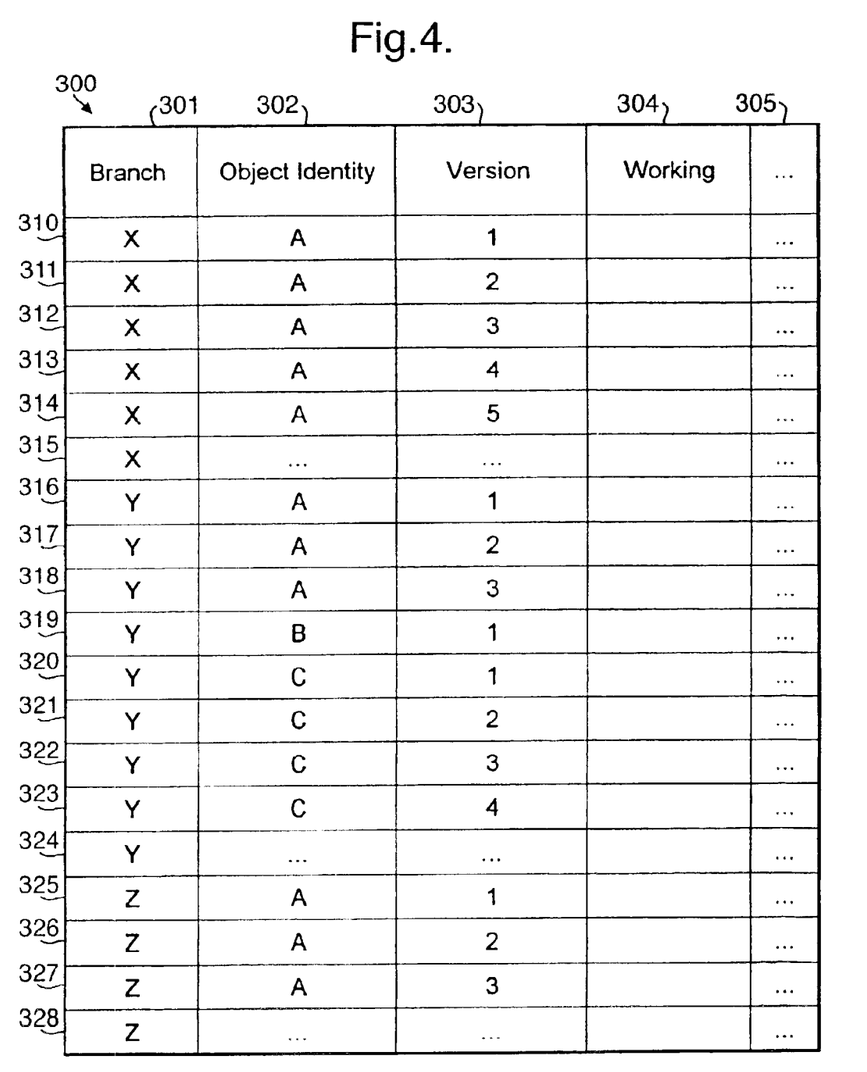
FIG. 4 shows a corresponding object versions table.

An example of the corresponding object versions table 300 according to the invention is shown in FIG. 4. This table is again arranged as rows and columns. The object versions table 300 has a branch column 301, an object identity column 302, a version column 303 and a working column 304. In a similar manner to the object branches table 200, the existence of further columns is generally indicated at 305.

In this example, the data contained within the branch column 301 and the object identity column 302 are in a similar format to that of the corresponding columns in the object branches table 200. The reason for this is that, in the present example relational techniques are used to implement the system, although it will be appreciated that alternatively pointer techniques could be used.

Unlike in the object branches table 200, the object versions table 300 contains a row for every individual version of every object in each branch group. There are therefore many more rows in the object versions table 300 than the object branches table 200.

As there is a separate row for each object version, these are identified using the version column 303. As can be seen in FIG. 4, the version column 303 contains the particular version of each object in the branch group. The primary key for the object versions table 300 is therefore the combination of the branch, object identity and version columns 301, 302, 303 respectively. These correspond to the object data column 204 of FIG. 3.

The row 210 in the object branches table 200 is therefore represented by five corresponding rows in the object versions table 300, that is rows 310 to 314. As shown in FIG. 4, the data in the branch column 301 and object identity column 302 for each of these rows 310 to 314 is identical to that contained in the branch column 201 and object identity column 202 of the object branches table 200. The version 1 (for XA1) is shown in row 310, with version 2 (for XA2) denoted in row 311 and so on to version 5 in row 314. The primary key for the object "XA2" (row 311) in the object versions table 300 therefore individually identifies the row containing the second version of object A in the branch group X (row 311). Unlike the object branches table 200, the object versions table 300 does not contain a copy of each individual object.

The primary purpose of the object versions table 300 is to allow software developers to work upon copies of object versions that have been "checked out" of the object branches table 200 and to record the detailed metadata for each object version. These checked out object versions are copied into the working column 304 where they are worked upon. This is described in more detail below.

Rows 316 to 324 of the object versions table 300 represent the branch group Y. The branch group Y contains the three objects A, B, C. Rows 316 to 318 are provided for the object versions YA1 to YA3 corresponding to row 212 of the object branches table 200. The row 319 in the object versions table 300 corresponds to the row 213 of the object branches table 200. In this case there is only one row in the object versions table, as there is only one version of the object B in the object branches table 200, that is version YB1. The rows 320 to 323 correspond to the four versions of the object C in the branch group Y. The three versions of the object A in the branch group Z are also provided with corresponding rows 325 to 327.

Rows 315, 324 and 328 represent schematically the possible existence of other rows according to other objects within the branch group X, Y and Z respectively. The additional column 305 represents a number of other columns for example containing file system permission information and developer comments.

The creation of a new branch group might occur when it is desired to generate a self-contained version of particular related objects for testing, modification, experimental or production purposes. The generation in the database of a new branch group containing versions of objects from existing branch groups will now be described with reference to FIGS. 5 and 6.

Considering the object version YC1 (FIG. 2) within the branch group Y, if a software developer wishes to use this object version as part of a new branch group T then the corresponding row 214 of the object branches table 200 is first addressed to obtain a copy of the object version YC1. However, this is only stored in its compressed delta format and therefore the object version YC4 is firstly decompressed and used in processing the compressed delta object versions YC3 and YC2 to generate a fully expanded object version YC2. Having obtained this, the object version YC1 can then be generated from the fully expanded object YC2 and the compressed delta object $\Delta$YC1.

Figure 5:
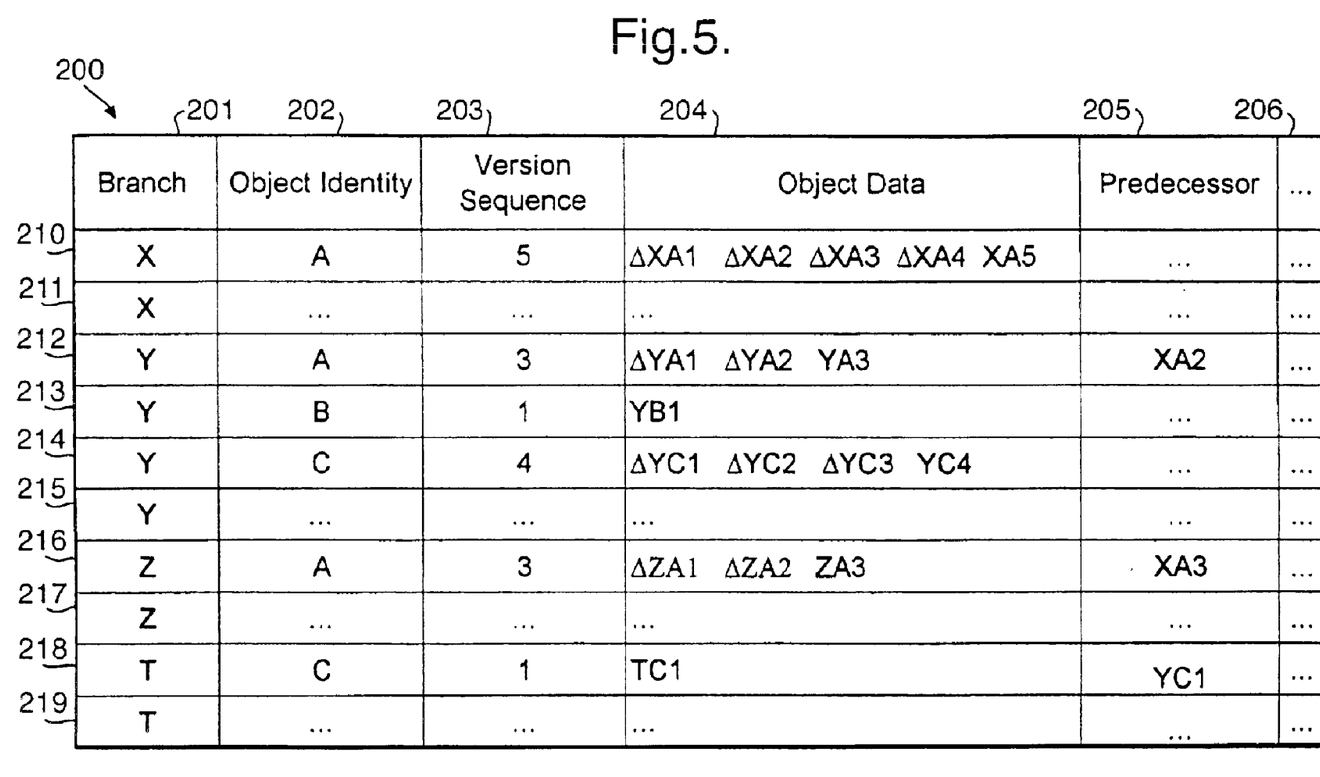
FIG. 5 shows the creation of a new branch group in the object branches table.

Once the version YC1 has been obtained, the object branches table 200 is amended to generate an additional row 218 corresponding to the new branch group T. This is shown in FIG. 5. Corresponding data are entered in the branch column 201, the object identity column 202 and the version sequence column 203. A new object version TC1 is thereby created. The predecessor column 204 is also updated to indicate the predecessor of the new object version, that is YC1. As the new object version TC1 is the only version of the object C in the branch group T, it is stored in a compressed format only.

Similar operations are performed in order to obtain copies of other objects from the same or other branch groups. These are stored in corresponding additional rows of the object branches table 200 that are generated to accommodate these objects. These additional rows are generally indicated by the row 219.

Figure 6:
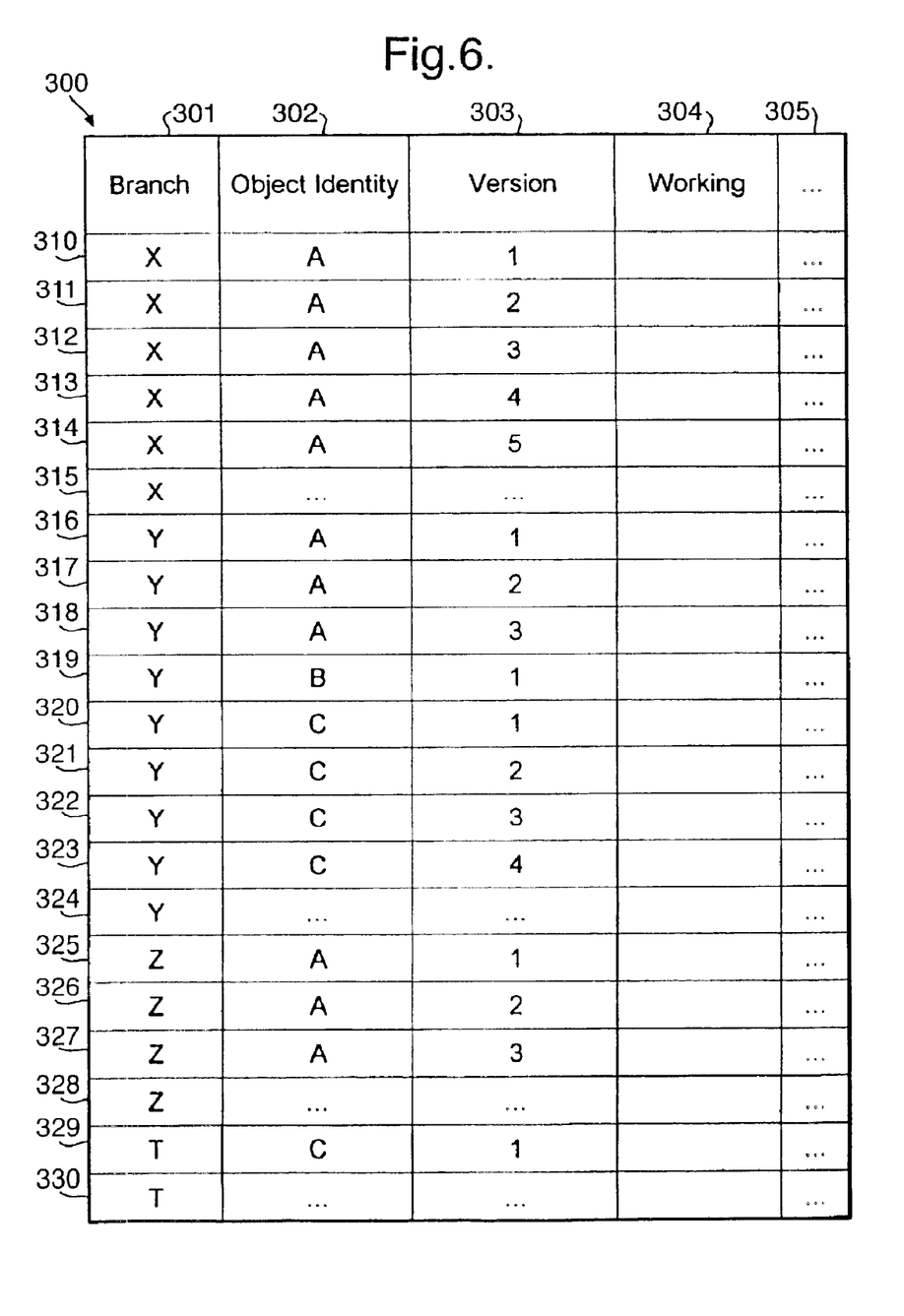
FIG. 6 shows the creation of the first object version in a new branch group in the object versions table.

A corresponding amendment is also made to the object versions table 300 as shown in FIG. 6. Here an additional row 329 is generated corresponding to the object version TC1 stored in the new branch group T. Additional rows are provided for each of the other object versions placed within the branch group T, these being generally represented by the row 330.

As object versions contained in a new branch group will generally be worked upon immediately, these object versions may alternatively be placed directly in the working column 304 of the object versions table 300 in a fully expanded form for convenient and immediate access.

Much of the work of software developers involves the modification of particular objects within branch groups. This results in the creation of new versions of the objects and an example of this will now be described.

Figure 7:
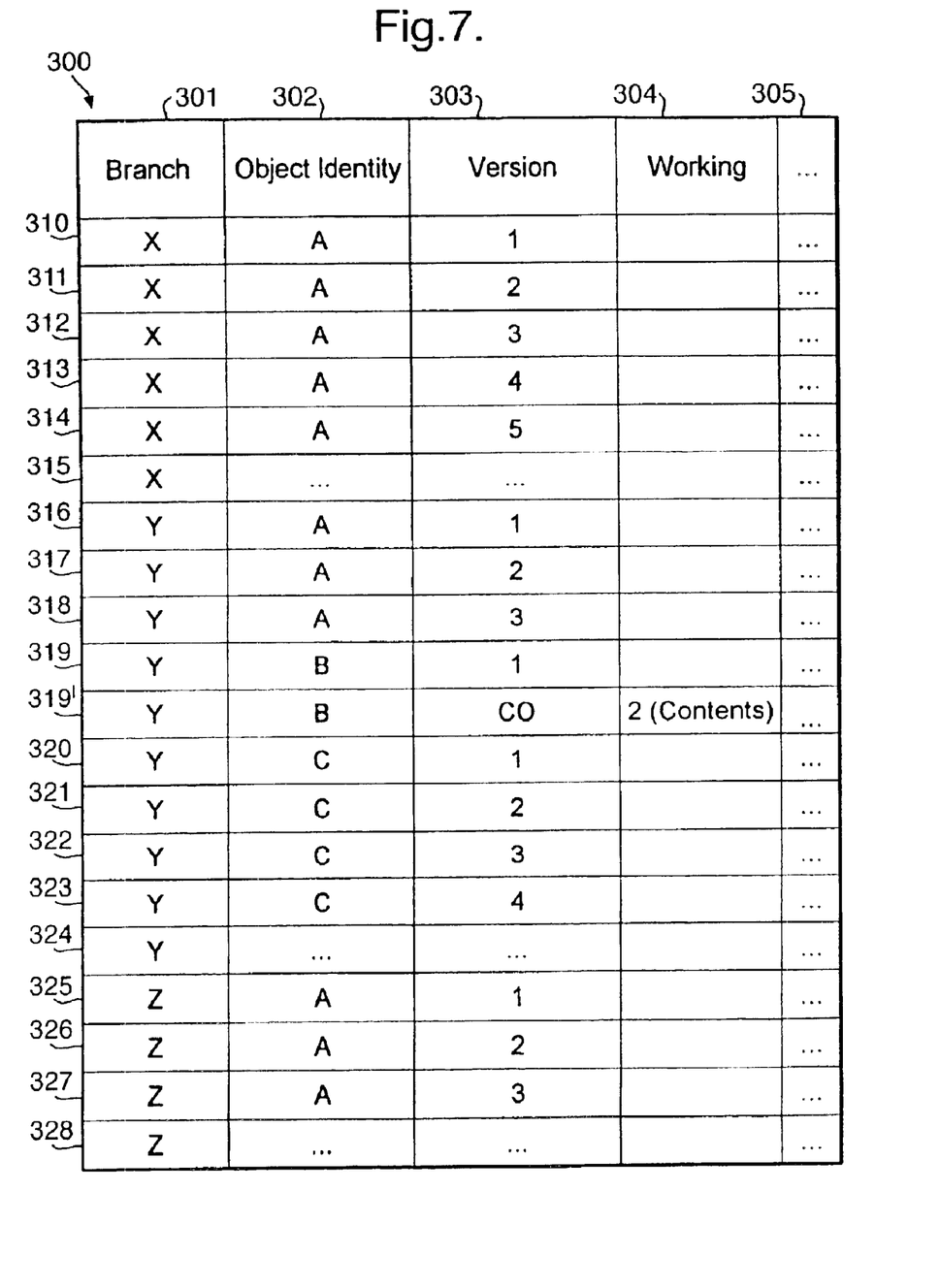
FIG. 7 shows the modification of an object version in the object versions table.

Referring to the branch group Y, the object versions table 300 shown in FIG. 4 indicates the existence of only one version of the object B within this branch group, that is version YB1 (row 319). If a software developer wishes to make some amendments to this, then the relevant object is first located in the object branches table 200 (row 213 of FIG. 3). A corresponding row 319' is then generated in the object versions table as shown in FIG. 7. The branch group and object identity information are generated in the corresponding columns 301 and 302 of this new row.

The object version YB1 is first fully expanded and then copied to the working column 304 of the object versions table 300 where it is retained within the new row 319' whilst it is modified. The object version is thereby "checked out" of the object branches table 200 and the new object version name "YB2" is assigned as part of the checking out process, this name being determined by the data in the version sequence column of row 213. As shown in FIG. 7 the contents of the checked out filed are worked upon within the working column 304. The corresponding field of the version column 303 in the object versions table 300 indicates the checked out status of the file, denoted by "CO" in FIG. 7. In a prior art system, the procedure of reading the object version YB1 may take about 20 seconds due to the time required to locate and access this object version within the repository. In the present example however, this reading procedure is approximately four times faster.

When the software developer has finished amending the object it is returned to the object branches table 200. This involves the copying of the new version YB2 back into the row 213 of the object branches table 200 ("checking in").

The corresponding version sequence is upgraded to "2" and the "delta" software is executed upon the versions YB1 and YB2 to generate the compressed delta version of the object YB1, denoted ΔYB1, and a compressed version of the object version YB2. In the object versions table 300, the copy of the object YB2 is deleted from the working column 304 and the version column 303 is updated to indicate the identity of the new object version YB2.

In practice a large number of object versions may be present within the working column 304 at any one time, reflecting the simultaneous work being performed by a number of developers upon different objects in different branch groups.

Figure 8:
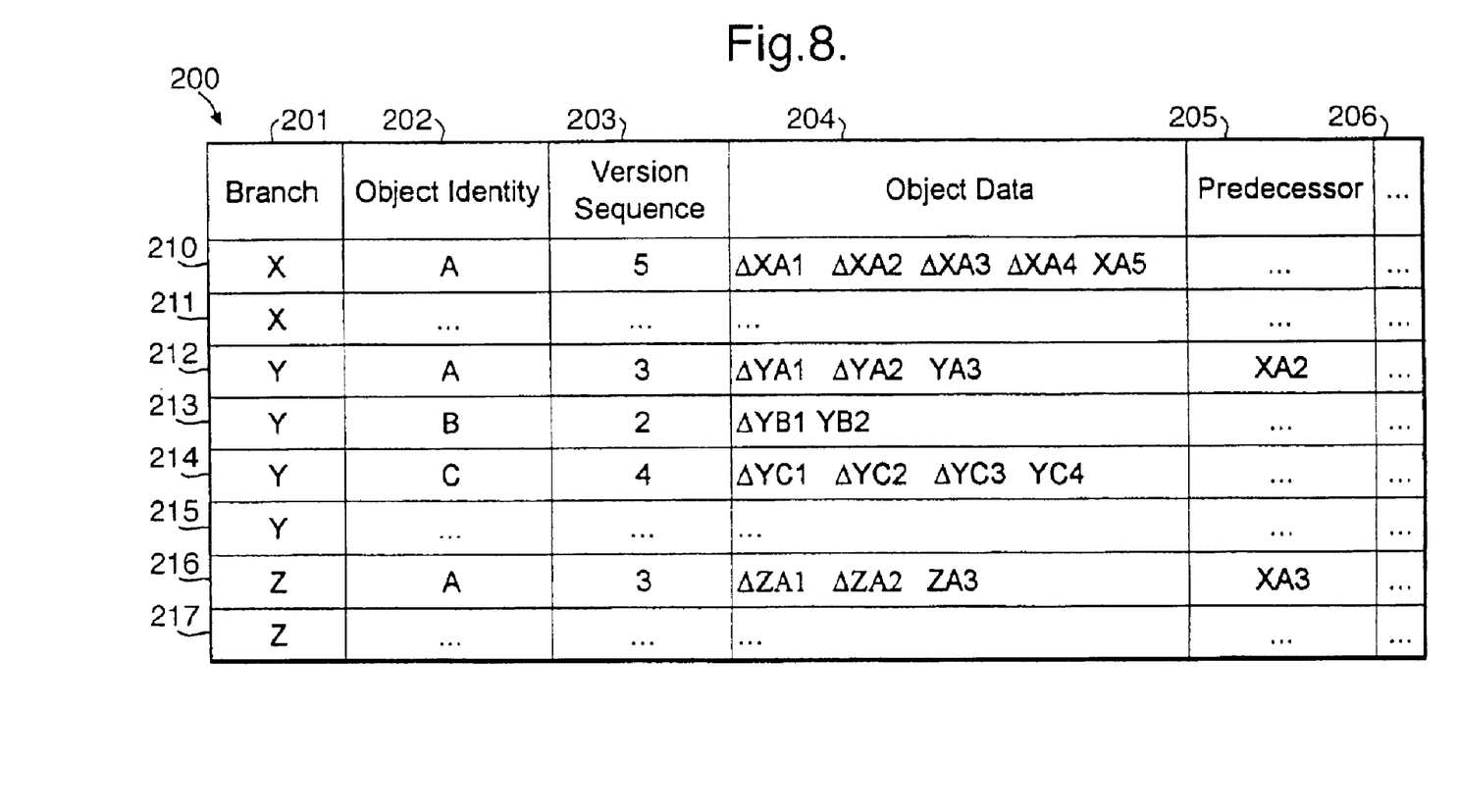
FIG. 8 shows the updated object branches table following modification of an object version.
Figure 9:
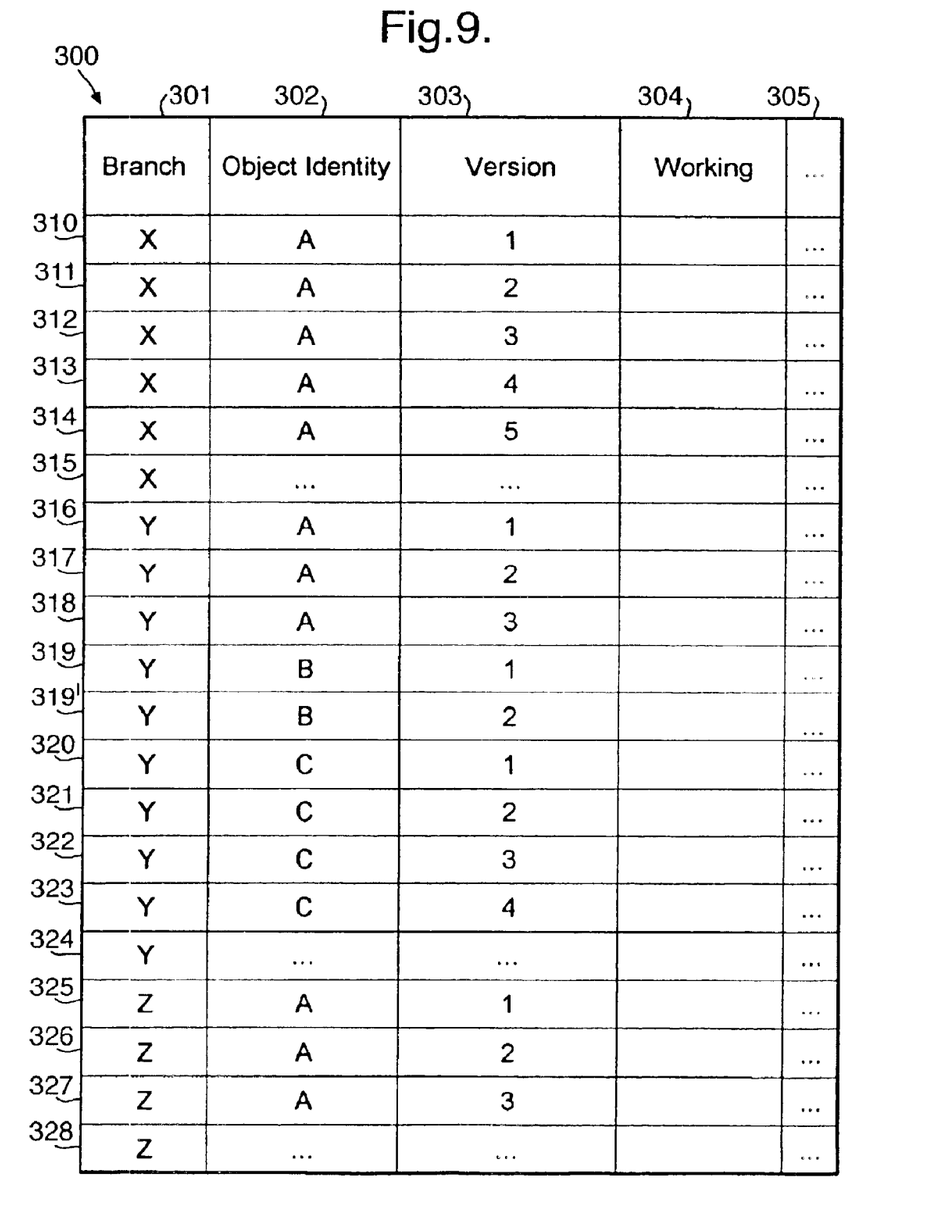
FIG. 9 shows the corresponding updated object versions table.

The updated versions of the object branches table 200 and object versions table 300 are shown in FIGS. 8, 9 respectively. It will be seen that the addition of a new version of the object YB2 does not increase the length of the object branches table 200, only the object versions table 300.

As has been stated, the primary key for the access of objects within the object branches table 200 is the combination of data held in the branch column 201 and the object identity column 202. This can be used to uniquely identify a particular row of this table. Similarly, the primary key for identifying a particular row of the object versions table 300 is the combination of data held in the branch column 301, object identity column 302 and the version column 303.

The manner in which these columns are used as the primary key allows partitioning of the data relating to particular branch groups within the database onto specific servers. One major advantage of partitioning is that this provides the ability to divide the system into discrete partitions such that operations including off-line processes can be performed upon these portions individually without affecting the system as a whole.

For example a "backing up" operation can be performed upon one partition at a time whilst the remainder of the system remains operational. By sequentially backing up each partition, the entire system may be backed up whilst generally remaining operational throughout. Partitions also allow for greater autonomy in the management of each individual partition.

Partitions improve data access performance as all the data relating to a particular branch group may be stored within one partition. Advantageously, a partition containing a "hot" or high activity area can be mapped to a large and fast file system. The manner in which the data are stored means that for multiple access operations on the same branch group the existence of the branch group within the partition only needs to be checked once. This is in contrast to known systems where such an operation would be required to be performed repeatedly. This therefore provides a considerable reduction in the processing operations required, resulting in a corresponding speed increase.

A further advantage of partitioning is that the replication of particular branch groups in different geographical locations can be easily achieved such that they can be worked upon locally.

As an example of partitioning, referring to FIGS. 8 and 9, the parts of the object branches table 200 and object versions table 300 relating to the branch group Y could be partitioned into a separate database file running upon a particular server. This file would therefore contain the information held in rows 212 to 215 of the object branches table 200, and rows 316 to 324 of the object versions table 300.

There are a variety of instances in which particular versions of the objects are accessed. These include the individual modification of object versions by developers and the creation of a new branch group. As the object versions are now arranged according to their branch, the mechanism of generating a "stripe" no longer involves a repeated search of the entire database for specific versions of objects. The organisation of the database in the present example provides more immediate localised access to the metadata required to form a stripe.

The time for generation of a stripe with the present invention is reduced from hours down to minutes as a result. Generally, a stripe is generated using particular object versions from various branch groups. For example, the generation of a new stripe might involve copies of only the latest versions of the objects from numerous branch groups. These are now much more rapidly located and obtained as the stripe formation only requires access to specific branch groups. As all the object versions within a branch group are stored together in a localised part of the object branches table 200, the time required to obtain this data is much reduced. A further increase in speed is provided because the actual number of rows in the object branches table 200 and the volume of data stored is much reduced with respect to the object table (repository) of known systems.

The implementation of the present invention using a database and transaction management system also improves the efficiency of operations such as stripe formation. As has been explained, stripe formation in known systems is treated as a single operation which prevents many developers from accessing the database. However, when a transaction management system is used with a relational database, the stripe formation is effected as individual operations to locate specific object versions in particular branch groups. The locking mechanism of the system will only lock out a software developer if simultaneous access of a particular object version is requested by the developer and the stripe formation process. The probability of this occurring is therefore quite low and only a small number of software developers are affected in each case.

Although it might be expected that the expansion of compressed or compressed delta object versions may serve to increase the time required to obtain the object versions data, in reality this work can be performed separately by dedicated processors.

In known systems the administration costs are large due to the problems of scalability. For example, a large system may require the use of over 200 VOBs. This causes the repetition of the same task over 200 times (upon each VOB) in order to perform the task upon the entire repository such as a back-up operation. This reduces the ability for such a task to be automated for the entire repository and the repetitive nature increases the probability of errors. As the present example is a single instance database, such tasks can be performed with much greater efficiency and automation.

The present invention therefore provides significant advantages with respect to known systems particularly in terms of access performance, a reduction in the volume of the data stored, and in administration costs.

It is important to note that while the present invention has been described in the context of a fully functioning system, those of ordinary skill in the art will appreciate that the processes of the present invention are capable of being distributed in the form of a computer readable medium of instructions and in a variety of forms. The present invention applies equally regardless of the particular type of signal bearing media actually used to carry out the distribution. Examples of computer readable media include recordable-type media such as a floppy disc, a hard disc drive, RAM and CD-ROMs, as well as transmission-type media, such as digital and analogue communications links.

What is claimed is:

1. A data storage system for storing a number of versions of a number of objects, the versions of the objects being arranged in branch groups, wherein at least one version of at least one object defines a branch group, and wherein the versions of the objects are stored in accordance with their branch group, the system comprising:

an object branches table including a branch column, an object identity column, a version sequence column and an object data column, wherein data identifying the branch group, the object and the number of versions of the object in the branch group, are stored in the branch column, object identity column and the version sequence column respectively, and the versions of the objects in each branch group are stored in the object data column, and wherein the object branches table is arranged such that only one row of the object branches table is provided corresponding to each object in each branch group; and, an object versions table having a branch column, an object identity column, a version column and a working column, wherein data identifying the branch group, the object and the object version in the branch group are stored in the branch column, object identity column and version column respectively, and subsequent versions of the objects are generated in the working column, and wherein the object versions table is arranged such that one table row is provided corresponding to each version of each object in each branch group.

2. A system according to claim 1, wherein a number of the object versions in the object data column are stored in a compressed format.

3. A system according to claim 2, wherein, for each version of a file object in a branch group, the version's contents are stored sequentially and as a function of the difference between the version and its predecessor or successor.

4. A system according to claim 3, wherein the function of the difference between versions comprises a compression algorithm.

5. A system according to claim 1, wherein the data used to identify a branch group in the branch column and/or the data used to identify the data objects in the object identity column is identical for the object branches table and the object versions table.

6. A system according to claim 1, wherein the branch column and object identity column comprise the primary key for addressing the object branches table.

7. A system according to claim 1, wherein the branch column, the object identity column and the version column comprise the primary key for addressing the object versions table.

8. A system according to claim 1 wherein when an object version in one branch group is generated using an object version in either the same or a different branch group and wherein the object branches table further comprises a column for storing data describing the relationship between each particular object version and the object version from which it was generated.

9. A system according to claim 8, wherein the column for storing the data relating the object versions is a predecessor column and wherein, for a particular object version, data is only stored in the predecessor column if the object version used to generate the particular object version, is in a different branch group.

10. A system according to claim 9, wherein, for each object version generated from another object version within the same branch group, the system is arranged such that the relationship between the object versions is assumed.

11. A system according to claim 1, wherein the part of the object branches table and the object versions table relating to a branch group are separated into corresponding partitions within the database.

12. A computer program product for performing a process of storing a number of versions of a number of objects, the versions of the objects being arranged in branch groups, wherein at least one version of at least one object defines a branch group, and wherein the versions of the objects are stored in accordance with their branch group, comprising:

a computer readable medium; and computer program code, recorded on the computer readable medium, executable by a processor, for implementing a system comprising:

an object branches table including a branch column, an object identity column, a version sequence column and an object data column, wherein data identifying the branch group, the object and the number of versions of the object in the branch group, are stored in the branch column, object identity column and the version sequence column respectively and the versions of the objects in each branch group are stored in the object data column, and wherein the object branches table is arranged such that only one row of the object branches table is provided corresponding to each object in each branch group; and, an object versions table having a branch column, an object identity column, a version column and a working column, wherein data identifying the branch group, the object and the object version in the branch group are stored in the branch column, object identity column and version column respectively, and subsequent versions of the objects are generated in the working column, and wherein the object versions table is arranged such that one table row is provided corresponding to each version of each object in each branch group.

13. A computer program product according to claim 12, wherein a number of the object versions in the object data column are stored in a compressed format.

14. A computer program product according to claim 13, wherein, for each version of a file object in a branch group, the version's contents are stored sequentially and as a function of the difference between the version and its predecessor or successor.

15. A computer program product according to claim 14, wherein the function of the difference between versions comprises a compression algorithm.

16. A computer program product according to claim 12, wherein the data used to the identify a branch group in the branch column and/or the data used to identify the data objects in the object identity column is identical for die object branches table and the object versions table.

17. A computer program product according to claim 12, wherein the branch column and object identity column comprise the primary key for addressing the object branches table.

18. A system according to claim 12, wherein the branch column, the object identity column and the version column comprise die primary key for addressing the object versions table.

19. A computer program product according to claim 12 wherein when an object version in one branch group is generated using an object version in either the same or a different branch group and wherein the object branches table further comprises a column for storing data describing the relationship between each particular object version and the object version from which it was generated.

20. A computer program product according to claim 19, wherein the column for storing the data relating the object versions is a predecessor column and wherein, for a particular object version, data is only stored in the predecessor column if the object version used to generate the particular object version, is in a different branch group.

21. A system according to claim 12, wherein the part of the object branches table and the object versions table relating to a branch group are separated into corresponding partitions within the database.

* * * * *